United States Patent

Hirayama et al.

[11] Patent Number: 5,837,374
[45] Date of Patent: Nov. 17, 1998

[54] LIGHT-SHIELDING LAYER, METHOD FOR PRODUCING SAME, AND METHOD FOR PRODUCING SUBSTRATE

[75] Inventors: Takayuki Hirayama, Kawasaki; Yoshifumi Morita, Muroran; Haruyoshi Sato, Kawasaki; Yutaka Otsuki, Yokohama; Masayuki Ando, Funabashi, all of Japan

[73] Assignees: Nippon Oil Co., Ltd.; Dai Nippon Printing Co., Ltd., both of Tokyo, Japan

[21] Appl. No.: 696,469

[22] Filed: Aug. 14, 1996

[30] Foreign Application Priority Data

Aug. 17, 1995 [JP] Japan .................................. 7-209427

[51] Int. Cl.$^6$ ................................................ G02F 1/1355
[52] U.S. Cl. ................................ 428/408; 430/7; 430/20; 430/321
[58] Field of Search ............................... 428/408; 430/5, 430/7, 20, 321

[56] References Cited

U.S. PATENT DOCUMENTS

| | | | |
|---|---|---|---|
| 4,506,002 | 3/1985 | Takaki et al. | 430/215 |
| 4,880,857 | 11/1989 | Mori et al. | 523/205 |
| 5,142,391 | 8/1992 | Fujiwara et al. | 359/67 |
| 5,372,902 | 12/1994 | Yamashita et al. | 430/7 |
| 5,527,649 | 6/1996 | Sato et al. | 430/7 |

FOREIGN PATENT DOCUMENTS

| | | |
|---|---|---|
| 63-314501 | 12/1988 | Japan . |
| 1-293306 | 11/1989 | Japan . |
| 50-34514 | 2/1993 | Japan . |
| 7-43522 | 2/1995 | Japan . |

*Primary Examiner*—Daniel Zirker
*Attorney, Agent, or Firm*—Darby & Darby

[57] ABSTRACT

A light-shielding layer including a light-shielding material containing a grafted carbon material, light-shielding material being electrodeposited to form the light-shielding layer, a method for producing a light-shielding layer including a step of electrodepositing a coating material containing a grafted carbon material on a electrode, and a method for producing a substrate having a light-shielding layer including the steps of (1) forming a photosensitive coating film on a transparent electrically conductive layer formed on a transparent substrate, (2) exposing a predetermined area of the photosensitive coating film to light, (3) removing and developing the photosensitive coating film for exposing the transparent electrically conductive layer, and electrodepositing a coating material containing a grafted carbon material on the exposed transparent electrically conductive layer for forming the light-shielding layer, and (4) heating said substrate thus obtained.

30 Claims, No Drawings

LIGHT-SHIELDING LAYER, METHOD FOR PRODUCING SAME, AND METHOD FOR PRODUCING SUBSTRATE

BACKGROUND OF THE INVENTION

This invention relates to a light-shielding layer having high definition and light-shielding capability, a method for producing the light-shielding layer, and a method for producing a substrate provided with the light-shielding layer. Particularly, this invention relates to a light-shielding layer which can be used for producing a color filter used in a liquid crystal display device or a substrate for counterelectrode used for a black and white display thin film transistor array substrate, a method for producing the light-shielding layer, and a method for producing a substrate provided with the light-shielding layer.

A color liquid crystal display device is typically represented by a thin film transistor active matrix color liquid crystal device. This device has a structure wherein, for example, a plate composed of a substrate provided thereon with thin film transistor (referred to as TFT hereinbelow) and a pixel electrode driven by the TFT, on which is formed an alignment layer, and a counterplate composed of a substrate provided thereon with a transparent electrically conductive layer, on which is formed a black matrix consisting of a black-hued light-shielding layer and colored layers such as red-hued layer, green-hued layer, or blue-hued layer (each layer will be refereed to as "R", "G", and "B", respectively in some instances hereinbelow), on which is further formed an alignment layer, are positioned facing each other with the alignment layers facing each other, liquid crystal is charged in the space formed between the counterplates, and the counterplates are held between two polarizing plates.

For producing a color filter used in a color liquid crystal display device, there are proposed a dyeing method, a dye-pigment dispersion method, a printing method, an electrodeposition method, and a transfer method. In any of these known methods, the precision in the arraying of the respective colored layers and the black-hued light-shielding layer is of utmost importance. Above all, the light-shielding layer needs to be positioned not only in registry with the counterelectrode substrate to avoid light leakage in the vicinity of the pixel electrode, but also without voids between the colored layers. Further, since the light-shielding layer significantly influences the picture quality such as contrast, the current practice is to produced the light-shielding layer with high precision and to form other colored layers so as to be overlapped to same extent with the light-shielding layer. For example, an evaporated film of metal such as chromium is patterned employing a photolithographic technique to produce a black matrix and the colored layers of R, G, and B layers are formed with small amounts of overlap with the black matrix at the boundary regions thereof. However, a color filter with superior surface planarity which is strongly desired when the color filter is used for the color liquid crystal display device, cannot be produced with such methods.

The thin film transistor (TFT) display device for black and white display has a structure similar to that of the above-mentioned color liquid crystal display device except that it does not have colored layers, and has transparent substrates provided with a light-shielding layer, which substrates function as counterelectrode substrate. The counterelectrode substrate is conventionally formed by coating a resist on a metal chromium layer formed on a glass substrate by sputtering; exposing to light, developing, etching, and exfoliating the resist; forming a light-shielding layer; and then forming a transparent indium-tin oxide (ITO) electrode by sputtering on the entire surface.

However, when a light-shielding layer is formed of metal, the evaporation method or lithography results in manufacture-related problems in that pinholes are easily formed, and the method involves complicated process. The light-shielding layer formed of metal also has high light reflectance and leads to inferior viewing properties of the display device. Above all, in manufacturing a TFT black and white display device, the vacuum process needs to be carried out twice in order to produce the light-shielding layer and the electrode, which requires complicated operation.

In order to solve these problems, a method of employing a photosensitive resin composition admixed with pigments of black or the like dark colors has been proposed in Japanese Laid-open Patent Applications Nos. 63-314501, 1-293306, and 5-34514. Specifically, a method of forming a layer of a photosensitive resin composition previously colored in a dark color on a transparent substrate, exposing via a pattern mask only the portions of the resin composition required as a light-shielding layer to light for curing the resin composition, and developing and removing only the unexposed portions of the resin composition; a method of forming a layer of a photosensitive resin composition previously colored in a dark color on a substrate on which R, G, and B layers have been formed, exposing the reverse substrate surface, that is the substrate surface not having the layer of the photosensitive resin composition, to light for curing the photosensitive resin composition, and developing and removing only the unexposed portions; and a combination of these methods, are disclosed. However, the photosensitive resin composition colored in dark color exhibits high light absorption so that curing cannot proceed to a sufficient depth upon exposure to light. Consequently, the photosensitive resin composition colored in dark color tends to be removed during removal by development so that the light-shielding layer having high light-shielding capability can hardly be produced. In addition, the photosensitive resin composition which is cured by photopolymerization upon light exposure is frequently employed. In that case, if the resin composition is exposed to light in atmospheric air, curing is obstructed significantly by oxygen contained in atmospheric air. In order to prevent this, complex operations such as provision of an oxygen interrupting film, or employing an atmosphere free of oxygen, such as vacuum, nitrogen, or an argon atmosphere, are needed in carrying out the light exposure. Although such cumbersome operations may be eliminated by increasing the amount of light exposure to an extreme degree, reflection, scattering, or leakage of light is increased, and the substrate temperature tends to be raised, thus presenting difficulties in the formation of the high-precision light-shielding layer.

On the other hand, when the light-shielding layer formed of the photosensitive resin composition containing black-hued or nearly black-hued pigment is employed as a black matrix for a counterelectrode substrate for a black and white display TFT array substrate, light leakage occurs in the vicinity of pixels during voltage-on time with the normally white system employed in the TFT array system, thus lowering the contrast, since the black matrix itself is not electrically conductive, and the liquid crystal on the black matrix is not responsive to electrical voltage. For preventing such drawbacks, it is necessary to provide a transparent substrate by sputtering on the overall surface, even if a transparent substrate having a transparent electrode is used as a counterelectrode substrate, thus complicating the manufacturing process.

For solving these problems, the present inventors proposed in Japanese Laid-open Patent Application No. 7-43522 a method of forming a light-shielding layer containing carbon black as a requisite component by electrodeposition. This electrodeposited light-shielding layer is electrically conductive and superior in light-shielding capability compared to the conventional light-shielding layer. However, since carbon black, which is electrically conductive, is used in this method, electrical conductivity should be controlled by restricting the heating conditions within a particular range in preparing a color filter.

In a liquid crystal display device, the light-shielding capability as required in the black matrix is also required for sealing portions of the liquid crystal. Sealing agent used in the sealing portions functions to adhere upper and lower substrates and to protect the liquid crystal contained therebetween, so that the sealing agent is required to have properties such as adhesiveness and moisture resistance. In addition, the sealing portions are recently expected to have light-shielding capability for preventing light leakage from the outer frame portion of the color filter. However, when an ordinary pigment such as carbon black having great coloring ability is admixed, the sealing portions not only lose its above properties, but also exhibit electrical conductivity, which leads to unexpected operation of the liquid crystal. Accordingly, light-shielding materials are not actually admixed in the sealing portions, though the sealing portions are expected to have light-shielding capability.

The light-shielding capability is also required for spacers in the liquid crystal. Spacers in the liquid crystal are required to control strictly the thickness of the liquid crystal, and organic or inorganic beads having a predetermined particle size are currently used for this purpose by being dispersed in a particular distributing ratio. However, such spacers will cause lowering of contrast if they are on the coloring pixels. Thus, it is proposed to make the black matrix act as a spacer. However, black matrix is required to have light-shielding capability as well as non-conductivity of electricity also in this case, though any material of black matrix which also functions as a spacer and a method of coating such material have not yet been found.

DISCLOSURE OF THE INVENTION

It is an object of the present invention to provide a light-shielding layer which is superior in definition and light-shielding capability, low in light reflectance, and capable of being controlled in its conductivity depending on the usage, and which can be used as black matrix and the like, a method for producing such a light-shielding layer, and a method for producing a substrate having such a light-shielding layer.

It is another object of the present invention to provide a method for producing a substrate through which a light-shielding layer can easily be formed with sufficient precision, and which is particularly advantageous for producing a color filter and a counterelectrode substrate for black and white display TFT array substrate.

According to the present invention, there is provided a light-shielding layer comprising a light-shielding material containing a grafted carbon material, said light-shielding material being electrodeposited to form said light-shielding layer.

According to the present invention, there is provided a method for producing a light-shielding layer comprising a step of electrodepositing a coating material containing a grafted carbon material on an electrode.

According further to the present invention, there is provided a method for producing a substrate comprising the steps of (1) forming a photosensitive coating film on a transparent electrically conductive layer formed on a transparent substrate, (2) exposing a predetermined area of said photosensitive coating film to light, (3) removing and developing the photosensitive coating film for exposing the transparent electrically conductive layer, and electrodepositing a coating material containing a grafted carbon material on the exposed transparent electrically conductive layer for forming the light-shielding layer, and (4) heating the substrate thus obtained.

PREFERRED EMBODIMENTS OF THE INVENTION

The light-shielding layer of the present invention includes a light-shielding material containing a grafted carbon material. The term "grafted" means that polymers are covalently bonded to a carbon material, preferably on its surface. Thus, the grafted carbon material intends a material wherein polymers are covalently bonded to a carbon material, preferably to the surface of a carbon material.

A carbon material generally has high electrical conductivity, so that a grafted carbon material is not necessarily used if only lowering of the volume resistivity is intended. However, in order to improve the definition of the light-shielding layer and the contrast for achieving the effect of the present invention, it is necessary to employ a grafted carbon material.

The carbon material may preferably have at least one functional group selected from a quinone group, a carboxyl group, and a hydroxyl group. Specifically, carbon black, graphite, carbon fibers, and carbon whiskers may be used. Among these, carbon black is preferred for its coloring ability. Grafted carbon black obtained from carbon black is preferred since it exhibits high light-shielding capability with only a small amount.

When carbon black is used as the carbon material, the particle size thereof is arbitrary, but the average particle size thereof is preferably not more than 0.5 $\mu$m, more preferably 0.01 to 0.3 $\mu$m in light of its coloring ability. Additionally, when the carbon black is dissolved in water to give an aqueous solution for measurement according to ISO-787-9, the pH of the solution is preferably not more than 7, more preferably 1 to 4.

The number average molecular weight of the polymers to be grafted on the carbon material is preferably 300 to 50000. The number average molecular weight of the polymers is preferably not less than 300 for facilitating control of the electrical conductivity of the light-shielding layer to be obtained, whereas it is preferably not more than 50000 for obtaining a sufficiently smooth light-shielding layer. Examples of the polymers may include a radical polymerizing monomer, an anionic polymerizing monomer, or a cationic polymerizing monomer; or a polymer having in its molecule at least one reactive group.

Grafted amount upon grafting (the amount of polymers based on 100 g of the carbon material) is preferably 10 to 300 g, more preferably 50 to 150 g. The grafted amount is preferably not less than 10 g for improving the definition of the light-shielding layer and facilitating control of electrical conductivity, whereas it is preferably not more than 300 g for improving the light-shielding properties of the light-shielding layer.

More specific examples of the grafted carbon material are: (A) a grafted carbon material obtained by forming polymers on the surface of the carbon material by polymerizing radical polymerizing monomers, anionic polymerizing monomers, or cationic polymerizing monomers (referred to as "grafted carbon material (A)" hereinbelow); or (B) a grafted carbon material obtained by reacting polymers having in the molecule thereof at least one reactive group selected from an axiridine group, an oxazoline group, an N-hydroxyalkylamido group, an epoxy group, a thioepoxy group, an isocyanate group, a vinyl group, an acryl group, a methacryl group, a silicon-containing hydrolyzable group, or an amino group (referred to as "grafted carbon material (B)" hereinbelow). For producing a light-shielding layer having high volume resistivity, it is preferred to employ the grafted carbon material (B), wherein the grafted amount can easily be increased.

The grafted carbon material (A) can be prepared by covalently bonding polymers consisting of radical polymerizing monomers, anionic polymerizing monomers, or cationic polymerizing monomers directly or indirectly to at least one functional group on the surface of a carbon material selected from a quinone group, a carboxyl group, or a hydroxyl group, through a conventional method such as described in Norio Tsubokawa and Takeshi Endo, Carbon, 140, 322 (1989). Among these, when radical polymerizing monomers are used, it is preferred to covalently bond the radical polymerizing monomers to the functional groups on the surface of the carbon material by using a peroxide-containing initiator such as benzoilperoxide and/or an azo initiator such as azoisobutyronitrile for increasing the grafted amount.

Examples of the radical polymerizing monomers may include (meth)acrylates such as methyl(meth)acrylate, butyl (meth)acrylate, cyclohexyl acrylate, or benzylacrylate; hydroxyalkyl(meth)acrylates such as hydroxyethyl(meth)acrylate, or hydroxybutyl(meth)acrylate; glycidyl(meth)acrylate; (meth)acrylic acid; styrene; acrylonitrile; or methylvinylketone. These monomers may be polymerized alone or in mixture to the carbon material for preparing the grafted carbon material (A).

When anionic polymerizing monomers are used, the grafted carbon material (A) may be prepared by reacting a carbon material with an organic metal such as alkyl lithium or phenylsodium, prior to polymerizing thereto (meth) acrylates such as methyl(meth)acrylate, or butyl (meth) acrylate, acrylamide, or mixtures thereof.

When cationic polymerizing monomers are used, the grafted carbon material (A) may be prepared by treating a carbon material with a strong acid such as perchlorate, prior to polymerizing thereto lactones, cyclic ethers, cyclic formalines, or mixtures thereof.

Reaction conditions in preparing the grafted carbon material (A) may vary depending on the monomers to be used, initiators, or the like, but when the radical polymerizing monomers are used, the reaction temperature is preferably 50° to 180° C., more preferably 70° to 130° C.

For preparing the grafted carbon material (B), the polymers to be grafted on a carbon material may preferably have in the molecule thereof one or more reactive groups mentioned above which can readily be reacted with the functional groups on the surface of a carbon material. Among these, polymers having one or more groups selected from an axiridine group, an oxazoline group, an N-hydroxyalkylamido group, an epoxy group, or an isocyanate group as reactive groups are preferred for their reactivity with the functional groups on the surface of a carbon material, and polymers having one ore more groups selected from an aziridine group, an oxazoline group, an N-hydroxyalkylamido group, or an epoxy group as reactive groups are particularly preferred. In reacting the carbon material and the polymers, polymers other than the above polymers, monomers, organic solvents, or the like may be present in the reaction system.

Reaction conditions in preparing the grafted carbon material (B) may vary depending on the polymers to be used, but when polymers having epoxy groups are used, the reaction temperature is preferably 80° to 180° C., more preferably 100° to 160° C. Further, in the preparation process, grafting is preferably effected under heat using a pulverizer such as a sand mill, a roll mill, an attriter, a ball mill, or a kneader. In this case, if it is desired to regulate viscosity in the reaction system, grafting may be carried out in the presence of a solvent such as isopropyl alcohol, butylcelosolve, methylisobutylketone, or diethyleneglycol dimethylether, which does not affect the grafting reaction.

The polymers are suitably selected taking the properties to be given to the grafted carbon material such as hydrophilic property, lipophilic property, or other affinities into account. If hydrophilic property is to be given, vinyl copolymers or vinyl polymers containing polyoxyethylene as principal component is preferably used. If lipophilic property is to be given, (meth)acrylate having hydrophobic ester groups such as methyl(meth)acrylate, butyl(meth)acrylate, cyclohexyl (meth)acrylate, or benzyl(meth)acrylate; or vinyl copolymers or vinyl polymers containing styrene as principal component is preferably used.

It is preferred that the grafted carbon material obtained by each of the above methods has ionic groups, particularly acid radicals such as carboxyl groups. Due to the presence of the ionic groups, when the grafted carbon material is dispersed in water as described later, prolonged dispersion stability can be achieved, and when the grafted carbon material is used as a coating material, dense coating can be effected. For preparing a grafted carbon material having acid radicals, when the grafted carbon material (A) is to be prepared, it is preferred to use (meth)acrylic acid as a whole or a part of the monomers. When the grafted carbon material (B) is to be prepared, it is preferred to use a (meth)acrylate copolymer wherein acid radicals are protected with ester groups for grafting, and then to remove the protective groups after the grafting. This may be performed, for example, by a method of grafting polymers containing acrylate as polymer unit such as t-butyl(meth)acrylate, t-amyl(meth) acrylate, or 1-phenylethyl(meth)acrylate on a carbon material, and severing the ester bond in each of the above acrylate by heating at a temperature of 30° to 150° C. to give a carboxyl group. In this case, the reaction proceeds rapidly by adding an acid catalyst such as chloric acid or sulfonic acid. But in most of the cases in the present invention, the carbon material to be used has acid radicals, so that the catalyst is not always needed. Alternatively, the grafted carbon material (B) may be prepared by grafting trialkylsilyl (meth)acrylate as comonomers on a carbon material, followed by hydrolyzing for giving the acid radicals.

The amount of the above-mentioned acid radicals in the grafted carbon material is preferably 10 to 500 mmol, more preferably 20 to 300 mmol based on 100 g of the grafted carbon material.

The light-shielding layer of the present invention is formed by electrodepositing a light-shielding material containing the grafted carbon material.

The light-shielding layer may be formed by electrodeposition coating a coating material and the like containing the grafted carbon material as a light-shielding material on an electrode.

The electrode may be a patterned electrode wherein an electrically conductive layer is formed only on portions of a substrate to be electrodeposition coated, a mat electrode wherein an electrically conductive layer is formed all over the substrate, or an electrode wherein a part of a mat electrode is covered with an insulator with only the portions to be electrodeposition coated being exposed, depending on the purpose. The material of the electrode may preferably be the one to be used for a transparent electrically conductive layer as will be described later, but other than that, either organic or inorganic material may be used as long as it is electrically conductive.

The above-mentioned coating material contains the grafted carbon material as a requisite light-shielding material component. In addition, the coating material may further contain such components as other coloring agent, an electrodeposition binder resin, electrically conductive particles, and various assistant agents, either alone or in combination, as desired.

As other coloring agent to be mixed optionally with the above coating material, conventional dyes and/or pigments may be used in combination. For example, vanadium trioxide, manganese dioxide, molybdenum disulfide, triton tetraoxide, Aniline Black, Sudan Black B, Acid Black 1 and 52, Fast Black K Salt, Nigrosin, or mixtures thereof may be used. In detail, the dyes and pigments shown in "COLOR INDEX", third edition, may also be employed. The coating material is usually colored dark with the grafted carbon material and these coloring agents.

As the above-mentioned electrodeposition binder resin to be mixed optionally with the coating material, resins having groups which become cationic and/or anionic groups when dissolved and/or dispersed in water may be used. When electrodeposition coating is performed on an ITO transparent electrically conductive layer, it is not preferred to perform cationic electrodeposition using a resin containing cationic groups because the ITO layer is oxidized by the acid contained in the electrodeposition solution. Thus it is preferred to perform anionic electrodeposition using a resin containing anionic groups. When the above cationic electrodeposition is to be performed, a substrate which will not be oxidized with the acid contained in the electrodeposition solution, such as stainless steel or platinum, needs to be employed, and the light-shielding layer produced by electrodeposition needs to be transferred onto a transparent substrate, such as glass, to be actually used. As the resins containing cationic groups, those produced by introducing amino groups or onium groups, such as ammonium, sulfonium, or phosphonium, into acrylic resin, epoxy resin, urethane resin, polybutadiene resin, or polyamide resin and rendering the resulting material soluble or dispersible in water with acids such as formic acid, acetic acid, propionic acid, or lactic acid, or with acidic substances.

Examples of the resins containing anionic groups may include acrylic resin, polyester resin, maleinated oil resin, polybutadiene resin, or epoxy resin which has carboxyl groups and which is rendered soluble or dispersible in water with basic substances such as triethylamine, diethylamine, dimethylethanolamine, or ammonia.

When the above electrodeposition binder resin is mixed in the electrodeposition coating material, the content of the grafted carbon material is usually 10 to 300 parts by weight, preferably 20 to 200 parts by weight based on 100 parts by weight of the electrodeposition binder resin. Such content is preferred for rendering stability and reliability to the light-shielding layer by heating, and forming a black-hued light-shielding layer with high light-shielding capability. The thus obtained light-shielding layer wherein the grafted carbon material is dispersed in the polymer matrix of the electrodeposition binder resin exhibits lower light reflectance than that of the light-shielding layer produced by metal sputtering or the like.

If the grafted carbon material has in its side chains of the polymer chains as much anionic or cationic groups as to enable the dispersion of the grafted carbon material in water, the electrodeposition binder resin is not necessarily added.

If the electrodeposition binder resin is used, the above-mentioned acidic or basic substances for rendering the resin soluble or dispersible, a curing agent, or an organic solvent may further be added alone or in combination.

The curing agent may suitably be selected depending on the electrodeposition binder resin. Preferable examples of the curing agent may include malamine, benzoguanamine, urea, or derivatives thereof; amino resins such as melamine resin or urea resin; phenolic resins; or blocked isocyanates. Among these curing agents, those being effective even at lower temperatures are particularly preferred for use.

Examples of the above-mentioned organic solvent may include glycolethers such as ethylene glycol monobutylether, ethylene glycol monohexylether, ethylene glycol monophenylether, propylene glycol monomethylether, propylene glycol monophenylether, diethylene glycol dimethylether, or triethylene glycol dimethylether; ketones such as acetone, methylethyl ketone, methylisobutyl ketone, cyclohexanone, isophorone, or N-methylpyrrolidone; ethers such as dibutyl ether, dioxane, or tetrahydrofuran; alcohols such as methoxybutanol, diacetone alcohol, octanol, butanol, or isopropanol; hydrocarbons such as toluene, xylene, cyclohexane, or hexane; esters such as ethyl acetate, butyl acetate, 2-methoxy ethyl acetate, 2-methoxy propyl acetate, or ethyl benzoate; and acid amides such as dimethyl formamide, N,N-dimethyl acetamide, or dimethyl sulfoxide. These organic solvents may be used along or in combination. By suitably adding these organic solvents, such effects as increase in solubility and dispersibility of the electrodeposition binder resin, improvement of bath stability, and smoothness of the film can be obtained.

As the electrically conductive particles to be mixed optionally with the coating material, at least one of carbon black; metal oxides such as tin oxide, ITO, indium oxide, titanium oxide, ruthenium oxide, or vanadium oxide; and metals such as gold, platinum, palladium, silver alloys, copper, or nickel, may be used. Two or more of these components may be used as a mixture in order to stroke a balance between light-shielding property and electrical conductivity of the light-shielding layer. If the electrically conductive particles are mixed, the content thereof is preferably 5 to 200 parts by weight based on 100 parts by weight of the grafted carbon material. When the light-shielding layer is desired to have low volume resistivity, for instance when the light-shielding layer of the present invention is used for producing a counterelectrode substrate for black and white display TFT array substrate, it is particularly preferred to admix the electrically conductive particles for lowering the volume resistivity.

Examples of the various assistant agents to be mixed optionally with the coating material may include dispersion assistant agents for dyes and/or pigments, levelling agents for improving smoothness of the coating films, viscosity adjustment agents, and anti-foaming agents.

The above-mentioned coating material may be prepared by a conventional method such as mixing the grafted carbon material optionally with other coloring agents such as dyes and/or pigments as described above, electrodeposition binder resins, acidic substances, basic substances, curing agents, organic solvents, electrically conductive particles, various assistant agents, water, or the like, dispersing thoroughly the components using a commonly used dispersing device such as a sand mill, a roll mill, an attriter, or a ball mill, and diluting the resulting dispersion with water into the predetermined concentration such as preferably 4 to 25% by weight, more preferably 7 to 20% by weight of solid contents, to give a coating material suitable for electrodeposition. Additionally, since the grafted carbon material or a neutralized material thereof has high solubility in organic solvents or water, the above dispersion process is not always needed, and the above components may simply be dispersed using an ordinary agitator to give an electrodeposition coating material.

In the coating material prepared according to the above method, the maximum particle size of the grafted carbon material is preferably not larger than 1 $\mu$m, in view of its light-shielding property, stability of the electrodeposition coating material, and smoothness and definition of the light-shielding layer. In other words, as for the particle size of the grafted carbon material on dispersion in the coating material, as measured by the light-scattering particle size distribution measurement device manufactured by OTSUKA ELECTRONICS CO., LTD. under the trade name of "PAR-III", it is preferred that the number average particle size (dn) is not more than 0.5 $\mu$m. It is more preferred that dn is not more than 0.3 $\mu$m, while the weight average particle size (dv)/number average particle size (dn) is not more than 2.5. it is most preferred that dn is not more than 0.3 $\mu$m, while dv/dn is not more than 2.

The method of electrodeposition coating is not particularly limited, and may be a conventional method such as soaking electrodes in a bath filled with the coating material and supplying electrical current on the electrodes. Conditions for electrodeposition coating are not particularly limited, and conditions such as coating voltage, electrodeposition time, or liquid temperature may suitably be adjusted depending on the types of the coating material, the thickness of the light-shielding layer to be produced, or the like. For example, the coating voltage is usually a DC voltage of 5 to 500 V, preferably 10 to 300 V, more preferably 10 to 150 V, the electrodeposition time is usually 5 to 300 seconds, preferably 10 to 200 seconds, and the liquid temperature is usually 10° to 35° C., preferably 15° to 30° C. In this case, it is preferred to discontinue the current supply after lapse of the electrodeposition time necessary to obtain the desired film thickness, to take out the substrate out of the bath, to wash off any excess coating material with water, and to dry the substrate.

The thickness of the light-shielding layer is not particularly limited, and may suitably be selected depending on usage. However, in view of the light-shielding properties, the dry thickness of the light-shielding layer is usually 0.3 to 5 $\mu$m, preferably about 0.5 to 3 $\mu$m. Since the thickness varies depending on the grafted carbon material, the types and size of the pigments to be mixed, mixing ratio of the electrodeposition binder resin, or the like, it may be decided depending on each coating material. The film thickness may be adjusted by controlling the electrodeposition conditions such as coating voltage, electrodeposition time, liquid temperature, or the like.

The volume resistivity of the light-shielding layer may freely be controlled within the range from $1\times10^2$ $\Omega\cdot$cm to $1\times10^{15}$ $\Omega\cdot$cm depending on usage by suitably selecting the manufacturing conditions of the grafted carbon material. For producing a light-shielding layer with low resistivity, the volume resistivity is preferably $1\times10^2$ $\Omega\cdot$cm to $1\times10^9$ $\Omega\cdot$cm. For producing a light-shielding layer with high resistivity, the volume resistivity is preferably $1\times10^5$ $\Omega\cdot$cm to $1\times10^{15}$ $\Omega\cdot$cm. The volume resistivity of the light-shielding layer may be increased by selecting the polymers grafted on the carbon material to have the average number molecular weight of 2000 to 50000, or increasing the grafted amount of the polymers, either alone or in combination. On the other hand, the volume resistivity of the light-shielding layer may be maintained as low as that of the original carbon material by selecting the polymers grafted on the carbon material to have the average number molecular weight of 300 to 7000, or decreasing the grafted amount of the polymers, either alone or in combination.

If the volume resistivity of the light-shielding layer is set at a low value, a light-shielding layer with high physical properties, particularly high adhesiveness is hard to obtain, while if the volume resistivity is set at a high value, the concentration of the pigments becomes low and the light-shielding properties become insufficient. Thus, it is preferred to set the volume resistivity within the preferred range.

Upon employing the light-shielding layer of the present invention in a counterelectrode substrate for black and white display TFT array substrate, if the light-shielding layer with low volume resistivity is used, a liquid crystal display exhibiting superior viewing properties can be produced without further forming a transparent electrically conductive layer on the light-shielding layer. For example, for improving the properties of the light-shielding layer and the viewing properties of the liquid crystal display, the volume resistivity is preferably $1\times10^2$ $\Omega\cdot$cm to $1\times10^9$ $\Omega\cdot$cm, more preferably $1\times10^2$ $\Omega\cdot$cm to $1\times10^7$ $\Omega\cdot$cm. That is, since the TFT liquid crystal display is usually employed with normally white, if the liquid crystal in contact with the light-shielding layer does not respond to the application of electrical voltage, the light polarized by the polarizing plate undergoes birefringence at the liquid crystal in contact with the light-shielding layer, causing light leakage in the vicinity of the pixels to remarkably lower the viewing properties of the liquid crystal display, such as lowering of contrast. Accordingly, if the volume resistivity of the light-shielding layer is too high, it is required to form another electrically conductive layer on the light-shielding layer for obtaining a liquid crystal display exhibiting superior viewing properties.

When the above light-shielding layer is used as a black matrix of a color filter for a liquid crystal display produced by electrodeposition, it is preferred to employ a light-shielding layer with high volume resistivity in order to prevent the colored layers such as R, G, and B from being electrodeposited on the black matrix. For example, the minimum volume resistivity of the light-shielding layer is preferably $1\times10^6$ $\Omega\cdot$cm, while the maximum volume resistivity thereof is preferably $1\times10^{15}$ $\Omega\cdot$cm for improving properties of the color filter such as contrast and protection properties of TFT.

The light-shielding layer of the present invention, irrespective of its volume resistivity, exhibits remarkably superior definition to the conventional light-shielding layer using non-grafted carbon material, and contrast thereof can be increased compared to that of the conventional light-shielding layer.

The light-shielding layer of the present invention can be formed as a black matrix which functions not only as a light-shielding layer but also as a spacer for controlling the film thickness of the liquid crystal. In this case, it is desirable for the light-shielding layer to have high volume resistivity, i.e. of preferably $1 \times 10^6$ to $1 \times 10^{15}$ Ω·cm, more preferably $1 \times 10^9$ to $1 \times 10^{15}$ Ω·cm.

The light-shielding layer of the present invention can also be used as a sealing agent having light-shielding properties at liquid crystal sealing portions of a liquid crystal display device. Also in this case, it is desirable for the light-shielding layer to have high volume resistivity, i.e. of preferably $1 \times 10^6$ to $1 \times 10^{15}$ Ω·cm, more preferably $1 \times 10^9$ to $1 \times 10^{15}$ Ω·cm.

In the present method for producing a substrate, first a positive photosensitive coating film or a negative photosensitive coating film is formed on a transparent electrically conductive layer formed on a transparent substrate.

Materials of the transparent substrate is not particularly limited as long as it is transparent and in the form of a plate. Examples of the materials may include quartz, various glasses, various transparent plastics (resins) such as polyester, polyphenylene sulfide, epoxy resins, acrylic resins, polymethylpentene, polyimides, polycarbonates, polyamides, polysulfone, polyether, polystyrene, acrylonitrile-styrene copolymers, or cellulose triacetate. In view of the properties of the ultimate product such as a color filter, it is desired that the surface of the transparent substrate is smooth and occasionally ground before use.

The transparent electrically conductive layer is preferably formed of tin oxide, indium oxide, ITO, or antimony oxide, and usually has a film thickness of 20 to 300 nm. The transparent electrically conductive layer may be formed by spraying, chemical vapor deposition (CVD), sputtering, or vacuum evaporation.

The positive photosensitive coating film may be formed by coating of a positive photoresist. There is no particular limitation to the photoresist provided that only the light-exposed portion is soluble in a developing solution and thereby removed. Examples of the positive photoresist may include compounds having quinone diazido groups, compounds containing diazomeldrum's acid or nitrobenzyl esters, a composition containing these compounds, and chemically amplified compositions employing a compound generating an acid by light (acid-generating agent by light). More specific examples may include a composition prepared by suitably mixing an alkali soluble resin having a film-forming function such as phenolic resin with a reaction product between a compound having a hydroxyl group and a quinone diazidosulfonic acid derivative or a quinonediazido compounds having an isocyanate group; and a chemically amplified composition composed of an acid-generating agent by light selected from aryl sulfonium salts, aryl iodonium salts, halomethyl triazine, esters of sulfonic acid, and tosylates having an o-nitrobenzyl group, and polyhydroxystyrene having a t-butoxycarbonyl group or a tetrahydropyranyl group introduced therein. The mixing ratio of each compound is not particularly limited, and may suitably be selected depending on the exposure conditions and development conditions.

The positive photoresist may be used by dissolving or dispersing the positive photoresist in an organic solvent. Examples of the organic solvent may include glycolethers such as ethylene glycol monobutylether, ethylene glycol monohexylether, ethylene glycol monophenylether, propylene glycol monomethylether, propylene glycol monophenylether, diethylene glycol dimethylether, and triethylene glycol dimethylether; ketones such as acetone, methylethyl ketone, methylisobutyl ketone, cyclohexanone, isophorone, and N-methylpyrrolidone; ethers such as dibutyl ether, dioxane, and tetrahydrofuran; alcohols such as methoxybutanol, diacetone alcohol, octanol, butanol, and isopropanol; hydrocarbons such as toluene, xylene, cyclohexane, and hexane; esters such as ethyl acetate, butyl acetate, 2-methoxy ethyl acetate, 2-methoxy propyl acetate, and ethyl benzoate; and acid amides such as dimethyl formamide, N,N-dimethyl acetamide, dimethyl sulfoxide. These organic solvents may be used alone or in combination.

The negative photosensitive coating film may be formed by coating negative photoresist. The negative photoresist is not particularly limited, provided that the light-exposed portion thereof is not removed by a developing solution and only the non-light-exposed portion can be removed by a developing solution, and it has, for example a group containing an ethylenic double bond capable of being cross-linked by light (referred as to a photosensitive group hereinbelow), such as (meth)acryloyl group and/or cinnamoyl group. A prepolymer or a resin having the molecular weight in general of about 500 to 10000 may be dissolved or dispersed in an organic solvent or water along with a photopolymerization initiator and occasionally with a dye and/or a pigment.

Examples of the prepolymer or the resin may include, the prepolymers such as epoxy (meth)acrylate, urethane (meth)acrylate, or polyester (meth)acrylate; cationic resins which are produced by introducing onium groups such as amino groups, ammonium, or sulfonium, and the above-mentioned photosensitive groups into acrylic resins, epoxy resins, urethane resins, or polybutadiene resins, and which are dissolved or dispersed in an organic solvent, or solubilized or dispersed in water with acids such as formic acid, acetic acid, propionic acid, or lactic acid or with acidic substances; and anionic resins which are produced by introducing carboxyl groups and the above-mentioned photosensitive groups into acrylic resins, polyester resins, maleinated oil resins, polybutadiene resins, or epoxy resins, and which are dissolved or dispersed in an organic solvent, or solubilized or dispersed in water with basic substances such as triethylamine, diethylamine, dimethylethanolamine, or ammonia.

Examples of the organic solvent may include those listed as the organic solvent for dissolving or dispersing the positive photoresist.

In view of simplification of the process and prevention of pollution, it is preferred that the prepolymer or the resin can be dissolved or dispersed in water.

The photopolymerization initiator may be any conventional material. Examples of the photopolymerization initiator may include benzoin and ethers thereof, benzyl alkyl ketals, benzophenone derivatives, anthraquinone derivatives, and thioxanthone derivatives. A sensitizer may be admixed with the photopolymerization initiator, if desired. The amount of the photopolymerization initiator to be added is preferably 0.1 to 30 parts by weight, more preferably 0.5 to 20 parts by weight based on 100 parts by weight of the negative photoresist, in order to give photocurability and to prevent lowering of strength of the photosensitive coating film.

The negative photoresist may be admixed with low molecular (meth)acrylates for adjusting viscosity and photosensitivity of the photosensitive coating film. Examples of the (meth)acrylates may include 2-hydroxyethyl (meth) acrylate, 2-phenoxyethyl (meth) acrylate, 3-phenoxy-2-hydroxypropyl (meth)acrylate, 2-ethylhexyl (meth)acrylate, tricyclodecane (meth) acrylate, hexanediol di(meth)acrylate, trimethylolpropane triacrylate, pentaerythritol triacrylate, dipenteaerythritol hexaacrylate, and tris (acryloyloxyethyl) isocyanurate. These may be used alone or in mixture. The mixing ratio of these (meth) acrylates is preferably 0 to 50 parts by weight, more preferably 0 to 30 parts by weight based on 100 parts by weight of the negative photoresist so that the photosensitive coating film will not be viscid.

The positive photoresist or the negative photoresist may be coated by immersion, spraying, spin coating, roll coating, screen printing, or electrodeposition.

There is no particular limitation to the film thickness of the photosensitive coating film, which may be suitably selected depending on the properties required of the color filter as the ultimate product, and the shape of the light-shielding layer to be formed. Above all, in relation to the shape of the light-shielding layer, i.e. for preventing formation of the light-shielding layer on the photosensitive coating film due to immoderately thin film thickness, preventing formation of the light-shielding layer wider than the determined line width, and preventing lowering of resolution of the photosensitive coating film due to excessively thick film thickness, the desirable film thickness of the photosensitive coating film is usually 0.5 to 20 times, preferably 1 to 10 times that of the light-shielding layer.

The film thickness of the photosensitive coating film may be adjusted by suitably selecting the proper coating conditions for each coating method. In the case of spin coating, for example, the film thickness can easily be controlled by adjusting the viscosity of the coating liquid or the number of revolutions of the spinner, while in the case of electrodeposition, for example, the film thickness can easily be controlled by adjusting the electrodeposition conditions such as coating voltage, electrodeposition time, or liquid temperature.

In the present method for producing a substrate, predetermined area of the positive photosensitive coating film or the negative photosensitive coating film is exposed to light.

When the positive photosensitive coating film is employed, the predetermined area to be exposed to light registers with the area on which the light-shielding layer is to be formed. The predetermined area may be exposed to light via a mask exhibiting light-transmitting properties only at portions thereof registering with the light-shielding layer. When the negative photosensitive coating film is employed, the predetermined area to be exposed to light registers with the area other than those on which the light-shielding layer is to be formed. The predetermined area may be exposed to light via a mask exhibiting light-transmitting properties only at portions thereof registering with other area than the light-shielding layer.

The light exposure may be effected using a light source capable of generating a large quantity of ultraviolet rays such as high-pressure mercury lamp, an ultra-high pressure mercury lamp, a xenon lamp, a metal halide lamp, an excimer laser, or a synchrotron light radiator (SOR). If necessary, a radiation other than the ultraviolet ray may be employed. The light exposure conditions may suitably be selected depending on the photosensitive coating film, the method or the apparatus for light exposure. For example, there is no particular limitation to the amount of light exposure, which may suitably be selected depending on the light source or the photosensitive coating film. The amount of light exposure is usually 0.1 to 1000 mJ/cm$^2$, preferably 5 to 500 mJ/cm$^2$.

In the present method for producing a substrate, next, the portions of the positive photosensitive coating film which has been exposed to light, or the portions of the negative photosensitive coating film which has not been exposed to light, are removed and developed for exposing or baring the transparent electrically conductive layer, on which the coating material containing the grafted carbon material is electrodeposited according to the above mentioned method to form a light-shielding layer.

There if no particular limitation to the removing and developing method, which may suitably be selected depending on the amount of light exposure, solubility of the photosensitive coating film in the developing solution, types and concentration of the developing solution, developing temperature or time.

There is no particular limitation to the developing solution used for the removing and developing, provided that it is capable of removing and developing the light exposed or unexposed portions of the photosensitive coating film. The developing solution may suitable be selected depending on the types of the photosensitive coating film and conditions of light exposure. Specifically, aqueous solutions of acidic substance or basic substance, organic solvents, or mixtures thereof may be used. However, in view of the toxicity and working environment, it is preferred to use the aqueous solution type developing solution.

As the developing solution used with the positive photoresist, an aqueous solution of a basic substance, an organic solvent, or a mixture thereof may be used, but an aqueous solution type developing solution is particularly preferred. Examples of the aqueous solution type developing solution may include aqueous solutions of sodium carbonate, sodium hydrogen carbonate, sodium metasilicate, tetraalkyl ammonium hydroxide such as tetramethyl ammonium hydroxide, sodium hydroxide, potassium hydroxide, ammonia, or mixtures thereof. Examples of the organic solvent may include alcohols, glycol ethers, ketones, hydrocarbons, chlorinated hydrocarbons, and mixtures thereof.

On the other hand, as the developing solution used with the negative photoresist, an aqueous solution of an acidic or basic substance, an organic solvent, or a mixture thereof. As the aqueous solution type developing solution, when a cationic resin is employed in the negative photoresist, an aqueous solution of an acidic substance such as an organic acid, e.g. formic acid, acetic acid, propionic acid, or lactic acid, or an inorganic acid, e.g. hydrochloric acid or phosphoric acid, or a mixture thereof may be used. On the other hand, when an anionic resin is employed in the negative photoresist, a basic substance such as sodium carbonate, sodium hydrogen carbonate, sodium metasilicate, tetraalkylammonium hydroxide, sodium hydroxide, or potassium hydroxide, or an aqueous solution of each of the basic substances may be used. When both the cationic and anionic resins are used, the organic solvent may be used. As the organic solvent, alcohols, glycol ethers, glycols, ketones, hydrocarbons, or chlorinated hydrocarbons, or mixtures thereof may be used.

The developing solution may be admixed with surfactants or anti-foaming agents for improving wettability or anti-foaming properties.

When the aqueous solution of tetramethyl ammonium hydroxide is used as the developing solution for the positive photoresist, the concentration of tetramethyl ammonium hydroxide may suitably be selected from the range of usually 0.01 to 20% by weight, preferably 0.05 to 10% by weight, the temperature from the range of usually 10° to 80° C., preferably 15° to 40° C., and the developing time from the range of usually 2 to 600 seconds, preferably 4 to 300 seconds. When the aqueous solution of sodium carbonate is used as the developing solution for the negative photoresist, the concentration of sodium carbonate may suitably be selected from the range of usually 0.01 to 25% by weight, preferably 0.05 to 15% by weight, the temperature from the range of usually 10° to 70° C., and the developing time from the range of usually 5 to 600 seconds, preferably 5 to 300 seconds. When the aqueous solution of lactic acid is used as the developing solution for the negative photoresist, the concentration of lactic acid may suitably be selected from the range of usually 0.01 to 50% by weight, preferably 0.05 to 25% by weight, the temperature from the range of usually 10° to 70° C., preferably 15° to 50° C., and the developing time from the range of usually 2 to 600 seconds, preferably 4 to 400 seconds.

In the present method for producing a substrate, the substrate obtained through the above-mentioned steps is heated. The heating step may usually be carried out under the conditions for easily drying the moisture in the light-shielding layer formed in the electrodeposition step. When the electrodeposition binder resin has thermosetting properties, the heating step may be carried out under the conditions for partly effecting or completing the cross-linking reaction, depending on the purpose. Specific heating conditions may vary depending on the subsequent processing steps of the substrate, but may suitably be selected either for the light-shielding layer used for black matrix of a color filter, or for the light-shielding layer used for black matrix of a counterelectrode for a black and white display TFT array substrate. The heating conditions is usually 50° to 270° C., preferably 80° to 150° C.

If a black matrix of a color filter is formed using a non-grafted carbon material, and subsequently colored layers such as red-hued, blue-hued, and green-hued layers are formed by electrodeposition, the volume resistivity of the black matrix declines if the heating step is carried out under the ordinary heating conditions, causing over-coating of the colored layers such as red-hued, blue-hued, and green-hued layers, so that the light-shielding layer should be heated at an extremely low temperature. In contrast, if the grafted carbon material with high volume resistivity is used, heating conditions may be set freely without such limitation.

The light-shielding layer of the present invention has high definition and light-shielding properties, and low light reflectance, and the electrical conductivity thereof can be controlled as desired. It is also produced easily with sufficient precision. Thus, the light-shielding layer of the present invention is particularly useful for a color filter used in a liquid crystal display device, or a counterelectrode substrate for black and white display TFT array substrate.

According to the present method for producing a light-shielding layer, a light-shielding layer which has high definition and light-shielding properties, and low light reflectance, and of which electrical conductivity can be controlled as desired, can be formed easily with sufficient precision.

According to the present method for producing a substrate, a substrate provided with a light-shielding layer having high definition and light-shielding properties suitable for a color filter of a liquid crystal display or a counterelectrode substrate for a black and white display TFT array substrate can be produced easily.

EXAMPLES OF THE INVENTION

The present invention is now explained in detail with reference to Examples and Comparative Examples. However, these Examples are given only by way of illustration and are not intended for limiting the invention.

Synthesis Example 1
Synthesis of Grafted Carbon Black (GC-1)

1500 g of isopropyl alcohol was charged in a 5 liter reactor provided with an agitator, a condenser, and a thermometer, and heated to 65° C. and agitated.

Then, a mixture of 838 g of isobutylacrylate, 118 g of butylacrylate, 326 g of methylmethacrylate, 210 g of hydroxyethylacrylate, 8 g of glycidylmethacrylate, and 10 g of azoisobutyronitrile as a polymerization initiator was continuously dropped over 4 hours into the reactor, subsequently reacted for 2 hours, and then heated to 80° C. for further reaction for 1 hours, to thereby give a copolymer having the number average molecular weight of 12000.

300 g of copolymer varnish containing 50% by weight of the copolymer obtained above and 300 g of carbon black (manufactured by Degussa AG under the trade name of "Special Black 4", average particle size: 25 nm, pH: 2.5, the pH value was measured of an aqueous suspension of the carbon black with a glass electrode (ISO-787-9)) were charged in a stainless beaker, isopropyl alcohol was added to the mass to adjust the solid content to be 28 wt %, and the resulting mixture was kneaded for 30 minutes. Then glass beads were added to the mixture and stirred at 3000 rpm for 2 hours. After that, the glass beads were removed and excess isopropyl alcohol was evaporated under reduced pressure to give a paste. The paste was admixed with diethylene glycol dimethylether in an amount of 10% by weight of the resulting mixture, kneaded at 140° C. for 20 minutes by a kneader at 60 rpm for completing removal of the solvents and reaction, to thereby obtain a grafted carbon black (GC-1).

Synthesis Example 2
Synthesis of Grafted Carbon Black (GC-2)

1500 g of isopropyl alcohol was charged in a 5 liter reactor provided with an agitator, a condenser, and a thermometer, and heated to 65° C. and agitated.

Then, a mixture of 684 g of isobutylacrylate, 118 g of butylacrylate, 326 g of methylmethacrylate, 210 g of hydroxyethylacrylate, 154 g of t-butylacrylate, 8 g of glycidylmethacrylate, and 10 g of azoisobutyronitrile as a polymerization initiator was continuously dropped over 4 hours into the reactor, subsequently reacted for 2 hours, and then heated to 80° C. for further reaction for 1 hour, to thereby give a copolymer having the number average molecular weight of 12000.

600 g of copolymer varnish containing 50 wt % of the copolymer obtained above and 300 g of carbon black (manufactured by Degussa AG under the trade name of "Special Black 4") were charged in a stainless beaker, isopropyl alcohol was added to the mass to adjust the solid content to be 35 wt %, and the resulting mixture was kneaded for 30 minutes. Then glass beads were added to the mixture and stirred at 3000 rpm for 2 hours. After that, the glass beads were removed and excess isopropyl alcohol was evaporated under reduced pressure to give a paste. The paste was kneaded at 130° C. for 15 minutes by a kneader at 60 rpm for completing removal of the solvents and reaction, to thereby obtain a grafted carbon black.

Next, 300 g of the grafted carbon black thus obtained was dissolved in diethylene glycoldimethylether at 100° C., and the unsoluble components were filtered out. The resulting filtrate (20 wt %) was charged in a three-neck flask, 50 ml of 3N HCl aqueous solution was added to the filtrate with the nitrogen gas being blown into the flask, and the mixture was heated and stirred at 80° C. for 1 hours. The resulting mixture was condensed in vacuo at 60° C. to obtain an acid group-containing grafted carbon black (GC-2) in which a carboxyl group had been introduced in the copolymerizing site. The acid content of GC-2 was 35 mmol per 100 g of the solid.

Synthesis Example 3
Synthesis of Grafted Graphite (GC-3)

600 g of copolymer varnish containing 50 wt % of the copolymer prepared in Synthesis Example 2 and 200 g of graphite in the form of fine particles were charged in a stainless beaker, isopropyl alcohol was added, and the resulting mixture was kneaded for 30 minutes. Then glass beads were added to the mixture and stirred at 3000 rpm for 2 hours. After that, the glass beads were removed and excess isopropyl alcohol was evaporated under reduced pressure to give a paste. The paste was kneaded at 100° to 120° C. for 15 minutes by a kneader at 60 rpm for completing removal of the solvents and reaction, to thereby obtain a grafted graphite.

Next, 300 g of the grafted graphite thus obtained was dissolved in diethylene glycoldimethylether at 100° C., and the unsoluble components were filtered out. The resulting filtrate (20 wt %) was charged in a three-neck flask, 50 ml of 3N HCl aqueous solution was added to the filtrate with the nitrogen gas being blown into the flask, and the mixture was heated and stirred at 80° C. for 1 hours. The resulting mixture was condensed in vacuo at 60° C. to obtain an acid group-containing grafted graphite (GC-3) in which a carboxyl group had been introduced in the copolymerizing site. The acid content of GC-3 was 43 mmol per 100 g of the solid.

Synthesis Example 4
Synthesis of Grafted Graphite (GC-4)

100 g of carbon black (manufactured by Columbian Carbon Co. under the trade name "Neospectra II" was suspended in 300 g of benzen to give a suspension, which was subjected to azeotropic dehydration, admixed with 50 g of thionyl chloride at 80° C., and stirred under heating for 50 hours. After the reaction, the reactant was freed of benzen and unreacted thionyl chloride under reduced pressure, and vacuum dried at 90° C. for 24 hours.

Then 60 g of the carbon black thus obtained having acid chloride groups introduced therein, 10 g of 2,2'-azobis(2-cyanopropanol), 800 ml of dioxane, and 300 ml of α-picoline were charged in a 2000 ml flask, and stirred in a nitrogen atmosphere at ambient temperature for 8 hours by a magnet stirrer. After the reaction, the reacted carbon black was washed thoroughly with methanol, and vacuum dried at ambient temperature.

Next, 30 g of the carbon black thus obtained having azo groups introduced therein and 1000 g of methylmethacrylate were charged in a container which can be degassed completely. For degassing, the container was subjected to an operation of rapidly cooling the container under vacuum and blowing nitrogen gas into the container, which steps were repeated three to five times, and then the container was sealed. The sealed container was shaken at 70° C. for 6 hours. After the reaction, unreacted monomers were removed under reduced pressure to concentrate the reactant. The resulting concentrate was dissolved in ethanol and centrifuged at 20000G. After the supernatant was removed, the precipitate was dried to thereby obtain 51 g of grafted carbon black (GC-4).

Synthesis Example 5
Preparation of Dark-Hued Electrodeposition Coating Material (BK-1, BK-2, BK-3, and BK-4)

An acrylic resin (manufactured by TOA GOSEI CHEMICAL INDUSTRY CO., LTD. under the trade name of "ARON S-4030") was neutralized with triethylamine to pH of approximately 8, and admixed with deionized water to give an aqueous resin solution (S1).

To the aqueous resin solution (S1), each of the grafted carbon materials obtained in Synthesis Examples 1 to 4, respectively, was added under agitation to prepare dispersions.

By a separate process, the above-mentioned acrylic resin is mixed with a melamine resin (manufactured by SUMITOMO CHEMICAL CO., LTD. under the trade name of "M-66B") and neutralized to pH of approximately 8 with triethylamine. The neutralized mass was then admixed with deionized water to prepare an aqueous resin solution (T1).

The aqueous resin solution (T1) was added to each of the grafted carbon material dispersions to produce dark-hued electrodeposition coating materials (BK-1, BK-2, BK-3, and BK-4) having the compositions shown in Table 1. The resulting coating materials are thermosetting and exhibited anionic electrodeposition properties. The particle size distribution of the resulting coating materials was measured using a particle size distribution measurement device manufactured by HORIBA LTD. under the trade name of "LA-910". The results are shown in Table 1.

TABLE 1

| Dark-hued Coating | BK-1 | BK-2 | BK-3 | BK-4 |
|---|---|---|---|---|
| Grafted Carbon Material | GC-1 | GC-2 | GC-3 | GC-4 |
| Weight of Grafted Carbon Material | 450.0 g | 800.0 g | 390.0 g | 360.0 g |
| Nickel Fine Particles *1 | — | — | 50.0 g | — |
| Acrylic Resin *2 | 500.0 g | 430.0 g | 660.0 g | 690.0 g |
| Melamine Resin *3 | 250.0 g | 170.0 g | 250.0 g | 250.0 g |
| Triethylamine | 61.8 g | 61.8 g | 61.8 g | 61.8 g |
| Average Particle Size (nm) | 50 | 60 | 60 | 55 |

*1: "ENP-005" (mfd. by SUMITOMO METAL CO, LTD.)
*2: "ARON S-4030" (mfd. by TOA GOSEI CHEMICAL INDUSTRY CO., LTD.)
*3: "SUMIMAL M-66B" (mfd. by SUMITOMO CHEMICAL CO., LTD.)

Synthesis Example 6
Preparation of Hued Electrodeposition Coating Material (R, G, B)

An acrylic resin (manufactured by TOA GOSEI CHEMICAL INDUSTRY CO., LTD. under the trade name of "ARON S-4030") was neutralized with triethylamine to pH of approximately 8, and admixed with deionized water to give an aqueous rein solution (S2).

To the aqueous resin solution (S2), azo metal salt red pigment, Phthalocyanine Green, and Phthalocyanine Blue were added under agitation to prepare red-hued, green-hued, and blue-hued pigment dispersions.

By a separate process, the above-mentioned acrylic resin was mixed with a melamine resin (manufactured by SUMITOMO CHEMICAL CO., LTD. under the trade name of "SUMIMAL M-66B") and neutralized to pH of approximately 8 with triethylamine. The neutralizing mass was then admixed with deionized water to prepare an aqueous resin solution (T2).

The aqueous rein solution (T2) was added to each of the respective hued pigment dispersions to produce hued coating materials (R, G, and B) having the compositions shown in Table 2. The resulting coating materials were thermosetting and exhibited anionic electrodeposition properties. The particle size distribution of the resulting coating materials was measured in the same way as in Synthesis Example 5. The results are shown in Table 2.

TABLE 2

| Hued Coating Material | R | G | B |
|---|---|---|---|
| Color | Red | Green | Blue |
| Acrylic Resin *1 | 750.0 g | 750.0 g | 750.0 g |
| Melamine Resin *2 | 250.0 g | 250.0 g | 250.0 g |
| Triethylamine | 61.8 g | 61.8 g | 61.8 g |
| Phthalocyanine Blue *3 | — | — | 300.0 g |
| Phthalocyanine Green *4 | — | 300.0 g | — |
| Azo Metal Salt Pigment *5 | 300.0 g | — | — |
| Average Particle Size (nm) | 130 | 142 | 135 |

*1: "ARON S-4030" (mfd. by TOA GOSEI CHEMICAL INDUSTRY CO., LTD.)
*2: "SUMIMAL M-66B" (mfd. by SUMITOMO CHEMICAL CO. LTD.)
*3: "SR-150C" (mfd. by SANYO SHIKISO KK)
*4: "SAX" (mfd. by SANYO SHIKI SO KK)
*5: "PIGMENT RED 4BS" (mfd. by SANYO SHIKISO KK)

Example 1

On a "CORNING 7059" glass (trade name, available from CORNING JAPAN KK) of 1.1 mm thick having an indium tin oxide (ITO) film of 100 nm thick on its surface (referred to as a master plate 1 hereinbelow), a positive photoresist composed of a naphthoquinone diazido compound and a novolak cresol resin (manufactured by TOKYO OHKA KOGYO CO., LTD. under the trade name of "OFPR-800") was coated by a spin-coating method to have a dry film thickness of 3 $\mu$m. The resulting product was irradiated by the light from an ultra-high pressure mercury lamp at 70 mJ/cm$^2$ via a mask having a predetermined light-shielding pattern. After development with a 2.4 wt % aqueous solution of tetramethyl ammonium hydroxide, the positive photoresist at the light exposed portion was selectively removed to lay an ITO film surface thereat to the outside. After washing with water and drying, a DC voltage of 25 V was applied at 25° C. for 60 seconds across the master plate 1 as an anode and a stainless steel beaker containing the black-hued coating material (BK-2) exhibiting anionic electrodeposition properties as a cathode, to perform electrodeposition. The master plate 1 was hoisted from the stainless steel beaker, washed with ion-exchanged water and dried at 70° C. for 5 minutes.

After heating at 120° C. for 10 minutes, the entire surface of the master plate 1 was then irradiated with the light of the above-mentioned ultra-high pressure mercury lamp at 100 mJ/cm$^2$. The master plate was developed with a 2.4 wt % aqueous solution of tetramethyl ammonium hydroxide. It was seen that no change was noticed in the black-hued electrodeposited pattern and any residual positive photoresist was removed in its entirety. After washing with water and drying, the master plate 1 having the high-precision light-shielding layer having a film thickness of 1.8 $\mu$m was produced.

The volume resistivity of the light-shielding layer, as measured using an impedance analyzer manufactured by OTSUKA ELECTRONICS, CO., LTD., was 2×10$^{12}$ Ω·cm. The optical density of the light-shielding layer, as measured with a densitometer manufactured by KONICA CO, under the trade name of "KONICA DENSITOMETER PDA-65" was 3.5.

Example 2

A master plate provided with a high precision light-shielding layer was prepared in the same way as in Example 1 except that the dark-hued electrodeposition coating material (BK-2) was used instead of the black-hued coating material (BK-1). The film thickness of the light-shielding layer was 1.2 $\mu$m, the volume resistivity was 1×10$^{10}$ Ω·cm, and the optical density was 3.0.

Example 3

A master plate provided with a high precision light-shielding layer was prepared in the same way as in Example 2 using the dark-hued electrodeposition coating material (BK-2). The master plate was then heated at 220° C. for 60 minutes, irradiated by the light from an ultra-high pressure mercury lamp at 100 mJ/cm$^2$, and developed with a 2.4 wt % aqueous solution of tetramethyl ammonium hydroxide. It was seen that no change was noticed in the black-hued electrodeposited pattern and any residual positive photoresist was removed in its entirety. After washing with water and drying, the master plate having the high-precision light-shielding layer having a film thickness of 1.0 $\mu$m was produced.

The volume resistivity of the light-shielding layer was 1×10$^9$ Ω·cm, and the optical density was 3.0.

Example 4

A master plate provided with a high precision light-shielding layer was prepared in the same way as in Example 2 except that the dark-hued electrodeposition coating material (BK-3) was used instead of the dark-hued electrodeposition coating material (BK-2). The film thickness of the light-shielding layer was 2.0 $\mu$m, the volume resistivity was 1×10$^2$ Ω·cm, and the optical density was 2.8. In this case, using the dark-hued electrodeposition coating material, a pattern having the space of 10/10 $\mu$m between the lines was produced with high precision, whereas when an electrodeposition coating material containing non-grafted graphite was used, only a pattern having the space of 120/120 $\mu$m between the lines was produced.

Example 5

A master plate provided with a high precision light-shielding layer was prepared in the same was as in Example 2 except that the dark-hued electrodeposition coating material (BK-4) was used instead of the dark-hued electrodeposition coating material (BK-2). The film thickness of the light-shielding layer was 2.0 $\mu$m, the volume resistivity was 1×10$^4$ Ω·cm, and the optical density was 2.6.

Example 6

Using the master plate 1 provided with the light-shielding layer produced in Example 1, a color filter was produced according to an electrodeposition method as described below.

A positive photoresist (manufactured by TOKYO OHKA KOGYO CO., LTD. under the trade name of "OFPR-800") was coated by the spin-coating method on the master plate 1 to give a dry film thickness of 2.2 $\mu$m. Then, using a photomask exhibiting light-transmitting properties only at portions thereof registering with the red-hued layer, light exposure and development were performed for removing the portions exposed to light to thereby lay the ITO film thereat to the outside. Then a DC voltage of 40 V was applied at 25° C. for 10 seconds across the master plate 1 as an anode and a stainless steel beaker containing the red-hued coating material (R) exhibiting anionic electrodeposition properties as a cathode to perform the electrodeposition. The master plate 1 was hoisted from the stainless beaker, washed with ion-exchanged water and dried. The resulting master plate was then heat-treated at 120° C. for 10 minutes to give a red-hued mosaic-shaped layer. Another mosaic-shaped layer neighboring the thus prepared mosaic-shaped layer was exposed to light and developed. The green-hued coating material (G) was electrodeposited and heat-treated in the same way as for the red-hued coating material (R). The operation was repeated for the blue-hued coating material (B) for preparing a color filter. During the above-mentioned electrodeposition steps, the phenomenon of over-coating of the colored coating material on the light-shielding layer was not noticed. The developing solution employed was a 1 wt % aqueous solution of sodium hydroxide containing 5 wt % of a surfactant (manufactured by KAO CO., LTD. under the trade name of "PEREX NBL"). For complete curing, the color filter was heat-treated at 180° C. for 30 minutes to give a color filter having a black-hued light-shielding layer exhibiting superior transparency, uniformity, planarity, and high accuracy.

Example 7

Using the master plate provided with the light-shielding layer produced in Example 3 (referred to as the master plate 3 hereinbelow), a color filter having a film thickness of the light-shielding layer and each colored layers of 1.0 μm was produced in the same way as in Example 6. During the preparation of the color filter, the phenomenon of overcoating of the colored coating material on the light-shielding layer was not noticed. The obtained color filter had a black-hued light-shielding layer exhibiting superior transparency, uniformity, planarity, and high accuracy.

Example 8

Using the master plate 3 produced in Example 3, a color filter was produced according to the pigment dispersion method as described below.

Using a color mosaic system "CR-2000", "CG-2000", and "CB-2000" (trade name, manufactured by FUJI HUNT ELECTRONICS TECHNOLOGY KK), red, green, and blue hues were charged in the gaps between the light-shielding layers in accordance with the processing method as designated by these systems to thereby produce a color filter provided with a black-hued light-shielding layer having superior transparency, uniformity, planarity, and high accuracy. The photomask employed for light exposure had the light-transmitting portions equally dimensioned to the gaps between the light-shielding layers.

Example 9

Using a master plate 3 produced in Example 3, a TFT liquid display device for black and white display was prepared. A display device having superior viewing properties was obtained.

Comparative Example 1

An electrodeposition coating material having the same carbon black pigment concentration as that of BK-1 in Synthesis Example 5 was prepared using, instead of the grafted carbon black (GC-1) in Synthesis Example 1, the same, but non-grafted carbon black. Then, using this electrodeposition coating material, a master plate provided with a light-shielding layer was produced in the same way as in Example 3. The volume resistivity of the light-shielding layer was 80 Ω·cm, and the optical density was 3.2.

Using this master plate, a color filter was produced in the same way as in Example 7. While the red, green, and blue hues were electrodeposited on the light-shielding layers, a color filter having only poor planarity could be obtained.

Comparative Example 2

An electrodeposition coating material having the same carbon black pigment concentration as that of BK-2 in Synthesis Example 5 was prepared using, instead of the grafted carbon black (GC-2) in Synthesis Example 1, the same, but non-grafted carbon black. Then, using this electrodeposition coating material, a master plate provided with a light-shielding layer was produced in the same way as in Example 3.

Using this master plate provided with the light-shielding layer, a TFT liquid crystal display device for black and white display was prepared in the same way as in Example 9. A display device having remarkably inferior viewing properties to that of Example 9 was obtained.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

We claim:

1. A light-shielding layer comprising a light-shielding material containing a grafted carbon material, said light-shielding material being electrodeposited to form said light-shielding layer, said grafted carbon material having an exposed carboxyl group, said carboxyl group having been exposed by grafting a polymer having acrylate as a polymer unit on a carbon material, and severing an ester bond in the acrylate by heating the grafted product at a temperature of 30° to 150° C.

2. The light-shielding layer as claimed in claim 1 wherein said grafted carbon material is a material wherein a polymer and a carbon material are covalently bonded.

3. The light-shielding layer as claimed in claim 2 wherein said carbon material is selected from the group consisting of carbon black, graphite, carbon fiber, carbon whisker, and mixtures thereof.

4. The light-shielding layer as claimed in claim 2 wherein said carbon material is carbon black, and when said carbon black is dissolved in water to give a carbon black aqueous solution, the pH of said solution as measured by a method according to ISO-787-9 is not more than 7.

5. The light-shielding layer as claimed in claim 2 wherein the number average molecular weight of said polymer is 300 to 50000.

6. The light-shielding layer as claimed in claim 2 wherein said polymer is a polymerized product of monomers selected from the group consisting of a radical polymerizing monomer, an anionic polymerizing monomer, and a cationic polymerizing monomer.

7. The light-shielding layer as claimed in claim 2 wherein said polymer has in a molecule thereof a reactive group capable of reacting with one or more functional groups of the carbon material selected from the group consisting of an aziridine group, an oxazoline group, an N-hydroxyalkylamido group, an epoxy group, a thioepoxy group, an isocyanate group, a vinyl group, an acryl group, a methacryl group, a silicon-containing hydrolyzable group, and an amino group.

8. The light-shielding layer as claimed in claim 1 said grafted carbon material has an acid radical, the amount of said acid radical being 10 to 500 mmol based on 100 g of the grafted carbon material.

9. The light-shielding layer as claimed in claim 1 wherein the volume resistivity of said light-shielding layer is controlled within a range of $1\times10^2$ Ω·cm to $1\times10^{15}$ Ω·cm.

10. A method for producing a light-shielding layer comprising electrodepositing a coating material containing a grafted carbon material on an electrode, said grafted carbon material having an exposed carboxyl group, said carboxyl group having been exposed by grafting a polymer having acrylate as a polymer unit on a carbon material, and severing an ester bond in the acrylate by heating the grafted product at a temperature of 30° to 150° C.

11. The method as claimed in claim 10 wherein said grafted carbon material is a material wherein a polymer and a carbon material are covalently bonded.

12. The method as claimed in claim 11 wherein said carbon material is selected from the group consisting of carbon black, graphite, carbon fiber, carbon whisker, and mixtures thereof.

13. The method as claimed in claim 11 wherein said carbon material is carbon black, and wherein when said carbon black is dissolved in water to give a carbon black aqueous solution, the pH of said solution as measured by a method according to ISO-787-9 is not more than 7.

14. The method as claimed in claim 11 wherein the number average molecular weight of said polymer is 300 to 50000.

15. The method as claimed in claim 11 wherein said polymer is a polymerized product of monomers selected from the group consisting of a radical polymerizing monomer, an anionic polymerizing monomer, and a cationic polymerizing monomer.

16. The method as claimed in claim 11 wherein said polymer has in a molecule thereof a reactive group capable of reacting with one or more functional groups of the carbon material selected from the group consisting of an aziridine group, an oxazoline group, an N-hydroxyalkylamido group, an opoxy group, a thioepoxy group, an isocyanate group, a vinyl group, an acryl group, a methacryl group, a silicon-containing hydrolyzable group, and an amino group.

17. The method as claimed in claim 10 wherein said grafted carbon material has an acid radical, an amount of said acid radical being 10 to 500 mmol based on 100 g of the grafted carbon material.

18. The method as claimed in claim 10 wherein the volume resistivity of said light-shielding layer is controlled within a range of $1 \times 10^2$ $\Omega \cdot$cm to $1 \times 10^{15}$ $\Omega \cdot$cm.

19. The method as claimed in claim 10 wherein said coating material containing said grafted carbon material further contains an additive selected from the group consisting of a coloring agent, an electrodeposition binder resin, an electrically conductive particle, and mixtures thereof.

20. The method as claimed in claim 19 wherein said electrodeposition binder resin is selected from the group consisting of a resin containing a cationic group and a resin containing an anionic group.

21. The method as claimed in claim 19 wherein when said coating material containing the grafted carbon material further contains said electrodeposition binder resin, the content of the grafted carbon material is 10 to 300 parts by weight based on 100 parts by weight of the electrodeposition binder resin.

22. The method as claimed in claim 19 wherein when said coating material further contains said electrically conductive particle, and the content of the electrically conductive particle is 50 to 200 parts by weight based on 100 parts by weight of the grafted carbon material.

23. The method as claimed in claim 19 wherein said coating material containing the grafted carbon material has 4 to 25% by weight of solid content.

24. The method as claimed in claim 10 wherein the number average particle size (dn) and weight average particle size (dv)/number average particle size (dn) of the grafted carbon material in the coating material containing the grafted carbon material is dn$\leq$0.5 $\mu$m and dv/dn$\leq$2.5, respectively.

25. The method as claimed in claim 10 wherein the dry film thickness of the light-shielding layer to be obtained is 0.3 to 5 $\mu$m.

26. A light-shielding layer comprising a light-shielding material containing a grafted carbon material, said light-shielding material being electrodeposited to form said light-shielding layer, said grafted carbon material having an acid radical, the amount of said acid radical being 10 to 500 mmol based on 100 g of the grafted carbon material.

27. A method for producing a light-shielding layer comprising electrodepositing a coating material containing a grafted carbon material on an electrode, said grafted carbon material having an acid radical, an amount of said acid radical being 10 to 500 mmol based on 100 g of the grafted carbon material.

28. A method for producing a light-shielding layer comprising electrodepositing a coating material containing a grafted carbon material on an electrode, the volume resistivity of said light-shielding layer being within a range of $1 \times 10^2$ $\Omega \cdot$cm to $1 \times 10^{15}$ $\Omega \cdot$cm.

29. A method for producing a light-shielding layer comprising electrodepositing a coating material containing a grafted carbon material on an electrode, said coating material containing an electrically conductive particle, the content of the electrically conductive particle in said coating material being 5 to 200 parts by weight based on 100 parts by weight of the grafted carbon material.

30. A method for producing a light-shielding layer comprising electrodepositing a coating material containing a grafted carbon material on an electrode, said coating material containing an additive selected from the group consisting of a coloring agent, an electrodeposition binder resin, an electrically conductive particle, and mixtures thereof, said coating material having 4 to 25% by weight of solid content.

* * * * *